United States Patent [19]

Gallap et al.

[11] 3,859,401

[45] Jan. 7, 1975

[54] PROCESS FOR FABRICATING STRUCTURAL PANELS

[75] Inventors: Francis Gallap, Thousand Oaks; Reginald V. Tunstall, Oxnard, both of Calif.

[73] Assignee: Fibre-Thane, Inc., Van Nuys, Calif.

[22] Filed: Aug. 9, 1971

[21] Appl. No.: 170,224

[52] U.S. Cl............... 264/45.3 P, 52/309, 161/161, 264/253, 264/46.5, 264/46.7
[51] Int. Cl.......................................... B29d 27/00
[58] Field of Search................ 264/45, 253; 52/309

[56] References Cited
UNITED STATES PATENTS

| | | | |
|---|---|---|---|
| 3,084,973 | 4/1963 | Beckley | 264/45 X |
| 3,286,004 | 11/1966 | Hill | 264/45 |
| 3,389,196 | 6/1968 | Stahl | 264/45 |
| 3,546,060 | 12/1970 | Hoppe | 264/45 X |
| 3,561,181 | 2/1971 | Bassett | 264/45 X |
| 3,566,572 | 3/1971 | Wilkinson | 264/53 X |
| 3,591,444 | 7/1971 | Hoppe | 264/45 X |
| 3,598,686 | 8/1971 | Clark | 52/309 X |
| 3,630,819 | 12/1971 | Conger | 264/45 X |
| 3,646,180 | 2/1972 | Winneck | 264/45 |

FOREIGN PATENTS OR APPLICATIONS

| | | | |
|---|---|---|---|
| 564,024 | 9/1958 | Canada | 264/45 |
| 6,893 | 5/1963 | Japan | 264/45 |

Primary Examiner—H. S. Cockeram
Attorney, Agent, or Firm—Lyon & Lyon

[57] ABSTRACT

A process and apparatus are disclosed for fabricating a laminated structural panel useful for forming a portion of a dwelling or the like. The panel has a foam core and outer skins of a hard weather-resistant resin. The laminate is formed by spraying a liquid resin on two generally horizontal mold surfaces which are maintained under conditions which allow the liquid resin to gain structural integrity but which prevent a substantially complete curing of the resin. Next, a material capable of forming a foam is placed on the exposed surface of one or both of the resin layers which cover the mold surfaces. The mold is provided with movable sides and the apparatus is next closed to form a substantially closed cavity. The material capable of forming a foam is then permitted to foam within the closed cavity thereby filling the cavity and pressing the resin against the mold surfaces. The outer resin is then caused to cure thereby forming a finished, cured laminate. In a preferred embodiment, the outer skin is formed from a polyester-fiberglass resin mixture and the inner foam is formed from a polyurethane rigid foam. The process can be adapted to permit the integral molding of the windows, doors, electrical conduit, piping and the like. The process may be performed in a hinged mold having one stationary horizontal mold surface and a second hinged mold surface which opens 180° thereby forming two substantially horizontal mold surfaces. Movable sides may be provided along the edge of these surfaces.

13 Claims, 7 Drawing Figures

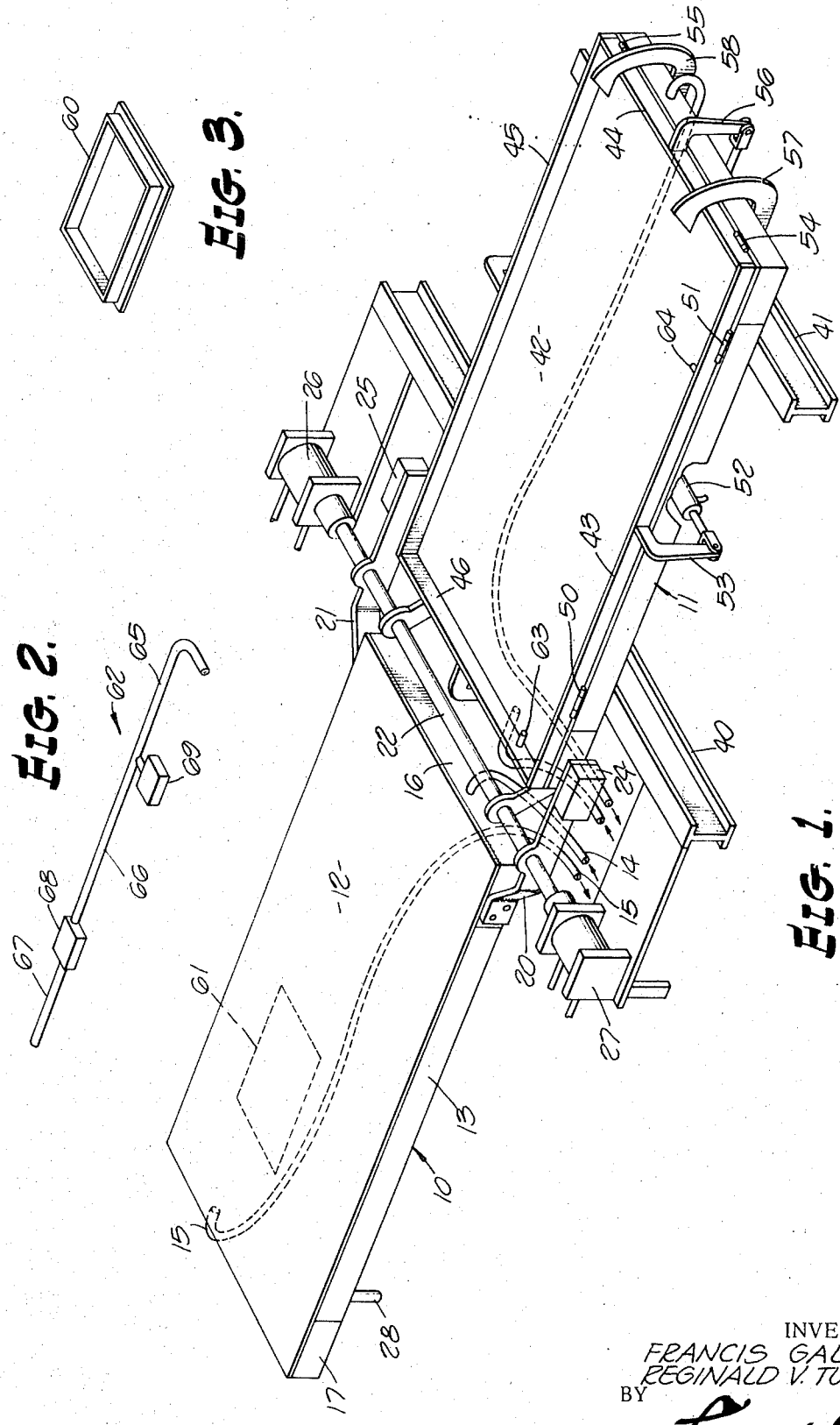

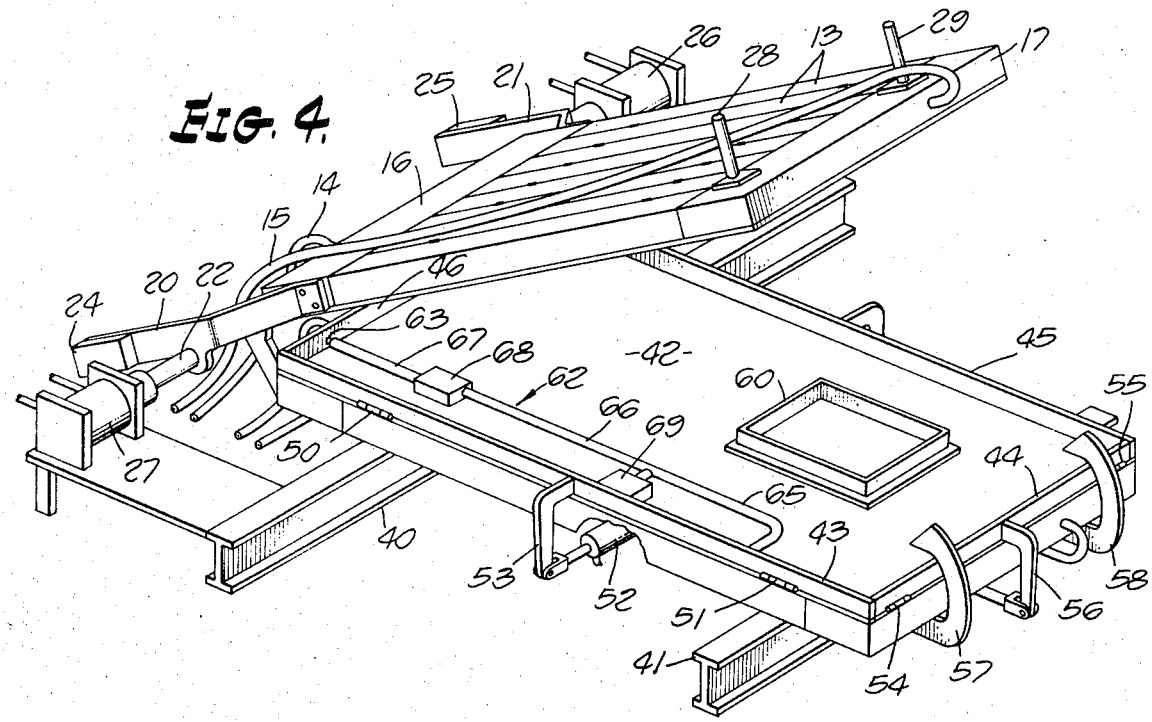

3,859,401

PROCESS FOR FABRICATING STRUCTURAL PANELS

CROSS REFERENCES TO RELATED APPLICATIONS

The mold apparatus of the present invention is disclosed in the pending U.S. patent application to applicant Francis Gallap, Ser. No. 31,129 filed Apr. 23, 1970.

BACKGROUND OF THE INVENTION

The field of the invention is prefabricated housing but the panels formed by the process of the present invention could be used in other structural applications where generally flat panels are used.

The advantages of prefabricating houses have long been recognized and various prefabrication techniques are widely used throughout the world. Several major shortcomings have prevented prefabrication techniques from more widespread use, such as the difficulty of moving the structure from the factory to the home site. The structural units of the typical prefabricated houses have great weight and bulk thus requiring that the dwelling be shipped in numerous parts. Shipping costs become an important part of the finished cost of the dwelling. Also, a relatively large amount of skilled labor is required to assembly the parts at the final site. Thus, some of the advantages of prefabrication are lost.

In an attempt to lighten the building units so that the shipping problem could be reduced, there have been numerous attempts to utilize plastics, including plastic foams. Several plastics have demonstrated excellent longterm weather resistance while still possessing excellent physical strength and fire retardance. Plastic foams have been developed which are excellent insulators and have substantial structural strength.

While the desired weight reduction could thus be obtained through the use of properly selected plastics, these materials were expensive to fabricate. For instance, the "House of the Future" at Disneyland, Anaheim, Calif., utilized an outer shell of polyester-fiberglass. This material, commonly used in boats, has demonstrated excellent long-term weather resistance and can be made sufficiently fire retardant. The classic steps used to fabricate a polyester-fiberglass shell include spraying a gel coat on the interior surface of a mold, next applying the resin and fiberglass followed by a curing step. The fiberglass is typically applied either in the form of woven roving or chopped fibers sprayed from a gun together with the liquid polyester resin. In either case, prior to curing the fiberglass must be rolled to insure that the resin is in intimate contact with the mold and there are no air spaces trapped between the resin and the mold surface.

Typically, in order to make a foam cored laminate, a second shell which will form the other surface of the laminate is fabricated and placed at a spaced distance from the first shell and the foaming mixture is placed into the space between the two panels. Depending on the nature of the foaming material, this either foams in place or is forced into the space under pressure. Alternatively, a foaming mixture may be sprayed in the inner surface of a cured shell. After the foam has cured, the second shell is sprayed on the cured foam. This latter procedure is described in detail in an article entitled "Fabricating the Structural Components of All Plastic 'House of the Future'" appearing in Plastics Technology, October 1958 at pages 921–927.

While attempts have been made to combine the simultaneous curing of a polyester resin and a urethane prefoam these attempts have resulted in a laminate which had insufficient strength. Typically, a friable layer was found to exist at the interface between the polyester resin and the polyurethane foam.

Other building laminates have been made using outer layers of wood, aluminum and the like with an inner layer of expanded polystyrene. In such laminates, it is necessary to form or shape the outer skins separately, cut them to size and insert the foam either by foaming in place or laminating the outer sheets to a finished prefoam panel. Such a panel is disclosed in a book entitled "Plastics in Building" published by the Building Research Institute, Washington, D.C. pages 55 and 56. Other attempts to use plastics in prefabricated dwellings are disclosed in *Engineer* Volume 217, page 959, May 29, 1964; *Plastic World*, July 1962 article entitled "Prefab Homes For All Seasons;" *Plastic World*, October 1962 article entitled "Portable Housing" and *Modern Plastics*, Volume 45, page 94, October 1968.

It is thus evident that there has been a concentrated effort by many companies both large and small to utilize plastics in prefabricated housing. The results, to date, have been somewhat disappointing because of the high cost of fabricating the building panels and of forming openings such as doors and windows in the panels.

SUMMARY OF THE INVENTION

The present invention is for a process for fabricating structural panels which process eliminates much of the labor heretofore required. The process utilizes a curable liquid resin such as polyester resin for the outer skin of the laminate. It uses a foamable liquid resin such as a rigid polyurethane resin for the inner portion of the laminate. The steps of the process include spraying the liquid resin, which may also contain chopped fiberglass or other reinforcing fibers, on the surface of two molds. One or both of these molds may have sides so that when these two molds are brought together a closed cavity is formed between the two mold surfaces. After the liquid resin has been sprayed on the mold surface, but before any substantial amount of curing has taken place, a liquid prefoam material is placed on the surface of the resin. Before this prefoam material expands, the two mold surfaces are brought into a closed position to form a closed cavity. The prefoam then is permitted to expand thereby pressing the uncured resin against the mold surfaces obviating the need for any rolling step. The outer resin is then permitted to cure thereby forming a finished laminate. The sides of the mold are then moved away from the finished laminate and the mold is opened and the final part removed.

BRIEF DESCRIPTION OF THE DRAWINGS

FIG. 1 is a perspective view of the molding apparatus in its opened position.

FIG. 2 is a perspective view of a conduit assembly.

FIG. 3 is a perspective view of a window frame assembly.

FIG. 4 is a perspective view of the mold of FIG. 1 in a partially closed position and containing the articles of FIG. 2 and 3 inserted therein.

FIG. 5 is a time-temperature curve.

FIG. 6 is a cross-sectional view of a series of joined panels.

FIG. 7 is a perspective view showing a portion of two panels prior to joining.

DESCRIPTION OF THE PREFERRED EMBODIMENTS

Applicant's invention will be described as applied to the fabrication of a panel having outer layers of polyester-fiberglass and an inner layer of rigid polyurethane foam. Turning now to FIG. 1, there is shown a two-part mold comprising a movable mold half 10 and a stationary mold half 11. Mold half 10 has a mold surface 12 which may be fabricated from any known mold material such as aluminum. Surface 12 is preferably coated with a mold release agent such as a silicone composition or a wax. Means for aiding in the mold release of polyester resins are well known to those skilled in the art and will not be described in detail herein. Mold surface 12 is supported by a series of rectangular tubes 13 which are best shown in FIG. 4. The tubes 13 serve not only to support surface 12 but also as conduits for a heat transfer fluid which enters mold half 10 through flexible inlet line 14 and leaves mold half 10 through flexible outlet line 15. As shown best in FIG. 4, inlet line 14 is connected to inlet manifold 16 which in turn is connected to all of the rectangular tubes 13. The fluid passes through tubes 13 into outlet manifold 17 and from there through outlet line 15. The means for controlling the heat transfer fluid temperature is conventional and therefore is not shown in the drawings.

Mold half 10 is supported at its inner end by arms 20 and 21 which in turn are affixed to a central shaft 22. The weight of mold half 10 is counter-balanced by counter-balance weights 24 and 25 which are attached to arms 20 and 21. Shaft 22 is caused to turn by hydraulic fluid in a conventional manner not shown. The outer end of mold half 10 is supported in its open position by legs 28 and 29.

Mold half 11 may be supported in any conventional manner. As shown in FIG. 1, the mold half is simply placed on two I beams 40 and 41. Mold half 11 is heated and cooled by a heat transfer fluid in the same manner as mold half 10 and hence this operation will not be described again here.

Mold half 11 has a mold surface 42 which is surrounded by four hinged edges 43 through 46. Edge 43 is attached to mold half 11 by hinges 50 and 51. The side is caused to open by the application of hydraulic fluid to piston 52 which is attached to edge 43 through arm 53. Similarly, edge 44 is attached to mold half 11 by hinges 54 and 55 and is caused to move by a piston, not shown, through arm 56. The edges in FIG. 1 are shown in their closed position and move away from mold surface 42 at the end of the molding cycle to aid in the release of the final molded laminate.

Since it is often desirable to fabricate a large part such as a wall having a surface of 8 feet by 20 feet, the pressure created within the mold by a foaming plastic can be very great. Thus, in order to help prevent an undesired opening of the mold during molding process, lid locking latches 57 and 58 are provided. These may be operated by hand or hydraulically operated and are attached to mold half 11 in a way so that they spring back to the position shown in FIG. 1. Such attachment is conventional and is thus not shown. By the use of a cam surface, latches 57 and 58 snap back as movable mold half 10 is nearly closed. In the fully closed position they snap over the upper surface of outlet manifold 17 and thus hold the mold half 10 in its closed position.

The use of the mold in fabricating a laminate with a smooth surface and with no windows or other openings therein is as follows. A fluid resin which may contain a reinforcing fiber is sprayed on mold surfaces 12 and 42. It is also sprayed on the inner surface of hinged edges 43 through 46. The temperature of the mold is then raised so that the resin will gel and gain some structural integrity. The mold surfaces may then be cooled to prevent a substantial curing of the resin. Next, a resin prefoam which is capable of expanding to form a plastic foam is placed on the upper surface of either or both of the resin and fiber layers. Preferably, the prefoam is distributed over the mold surface to make it unnecessary for the foam to flow a large distance. The amount of spreading required is dependent upon the nature of the prefoam and the liquid resin.

When the resin used is a polyester resin and the prefoam used forms a rigid polyurethane foam, it is important that the polyester resin be gelled, but not substantially cured prior to the addition of the prefoam. This gelling step is believed to prevent a reaction between the styrene monomer of the polyester and the prefoam which causes a friable layer at the interface which, in turn, causes great weakness and delamination. After the resin has gelled, most of the styrene monomer has either reacted or volatilized and is no longer available to cause an undesired reaction with the prefoam.

It is also important that the fluid resin be prevented from reaching a fully cured state at the foaming stage of the process. In this way, the pressure exerted by the prefoam after the mold has been closed will force the uncured resin firmly against mold surfaces 12 and 42 thus eliminating the necessity of rolling or otherwise forcing the resin against the mold surface.

After the prefoam has been added and distributed, mold half 10 is moved into its closed and latched position and the prefoam is permitted to expand. After closing, hot water may be passed through the rectangular tubes in each of the mold halves in order to aid the curing of the resin. The extent to which this heating is necessary is dependent upon the particular resin used and also upon the catalyst used with the resin. It furthermore is dependent upon the nature of the foam material used. For instance, with a highly active catalyst system and an exothermic foam, the heating step may be done away with completely.

After the outer skin and inner foam have cured, mold half 10 is opened and hinged edges 43 through 46 are swung away. The finished, cured laminate is then slid from mold surface 42 so that another cycle can be started. It is, of course, possible to pass cooling water through the rectangular tubes of each mold half which will cool the laminate thereby tending to increase its structural integrity and increasing the production rate from the mold.

Another important feature of the present invention is its adaptation to a process whereby window frames, door frames and the like may be integrally molded into the laminate. In this manner, important savings in labor are achieved since it is no longer necessary to cut an opening in the finished laminate and insert a frame therein. Furthermore, electrical conduit, wall boxes and the like as well as plumbing may be integrally molded within the wall panel. The piping or conduit is placed so that it extends to one or more edges of the panel and placed so that it matches the conduit in an adjacent and forms a continuous path from one panel to its adjacent panel.

The process including the installation of frames and conduit is carried out as follows. A window frame 60, shown in FIG. 3, is placed on the uncoated mold surface 42. Pins, not shown, may be attached to mold surface 42 to position and hold window frame 60 in a fixed predetermined position. Next, the mold surface 42 is sprayed with a liquid resin as described above. Mold surface 12 is also sprayed with a liquid resin except for that portion which will mate with window frame 60 when mold half 10 is closed. This area of non-coating may be brought about easily by the provision of a temporary mask or frame which may likewise be positioned by pins inserted in mold surface 12. The extent of the masked area in mold surface 12 is indicated by the dotted line 61 on mold surface 12. The resin should contact the upper edge of window frame 50 when mold half 10 is closed in order to provide a seal between the resin and the frame. Such a seal will help prevent leakage around the frame.

A particularly simple manner for trimming any excess resin from the interior of window frame 60 results from the provision of a relatively narrow edge of the upper surface of window frame 60. The height of window frame 60 is equal to the distance between mold surface 12 and mold surface 42 when the mold is closed. Thus, when the mold is closed the upper edge of window frame 60 will tend to push away and thin out the resin at its upper surface. After the curing step, that resin which has been squeezed inside window frame 60 may be simply trimmed away. Window frame 60 may be fabricated from aluminum, wood, plastic or other suitable material.

The prefabricated conduit assembly 62, shown in FIG. 2 is placed above mold surface 42 before the spraying of the mold surfaces. Since it is desirable that this conduit assembly mate with an assembly in an adjacent panel, it is desirable that its positioning within the panel be accurate. This may be readily accomplished by the provision of pins 63 and 64 in hinged edges 46 and 43.

Conduit assembly 62 comprises conduit lengths 65, 66 and 67, electrical boxes 68 and 69 together with conventional and appropriate fittings. The lower edge of boxes 68 and 69 as shown in FIG. 2 are open and will be available from the inside of the finished house. It is unnecessary to mask off the two areas of mold surface 42 which are below these two boxes. At the time of their placement, the resin is still in an uncured state and the boxes may be simply pressed down towards mold surface 42. Since the boxes are preferably fabricated from conventional galvanized steel, they have a relatively sharp edge and will thin out and tend to cut the soft resin at their contact point with mold surface 42. Furthermore, when the foam within the mold expands, it will tend to press the box against the mold surface 42. In this way, after the panel is cured, the small sections of cured resin may be simply cut away from the inside wall.

Channels or other identations may be readily formed in a laminate by placing an appropriately shaped member against one of the mold surfaces prior to its coating with resin. Similarly, various textures may be formed by texturing the mold surface. This process is, of course, commonly used in molding operations and may be advantageously used here to form, for instance, a bricklike, wood-like or other surface in the wall panels. Furthermore, a shingle-like surface may be formed for panels used in a roof member.

The finished panels may be joined together in countless ways. Various fittings may be provided to hold the panels together or they may be simply glued together. It is advantageous to provide notches so that the panels may be put together in only one way and thus a structure may be built by relatively unskilled labor. Various means may be used for preventing error such as the provision of notches, protrusions, and the like. A simple method of positioning a wall in a floor member is the provision of a channel having the same length as the wall section molded into the floor. A portion of such an assembly is shown in FIG. 6 in cross-section. There, wall panel 70 is shown in channel 71 which has been molded into floor panel 72. Similarly, outer wall panel 73 is placed in channel 74 also molded in floor panel 72. An adhesive, such as epoxy adhesive may be placed in channels 71 and 74 to provide a secure bond. Alternatively, various clamping means or other fastening means may be used. It is useful to provide temporary clamps to hold the panels together while the adhesive is gaining structural strength.

One possible means of joining two outer wall sections is shown in perspective in FIG. 7. There, wall panel 80 is placed in channel 81 of wall panel 82. Once again, an adhesive may be placed in channel 81 or against the end 83 of wall panel 80. When an epoxy adhesive is used, a particularly effective means for securing panel 80 to panel 82 results from the use of a two-part epoxy adhesive where one part is placed on end 83 and the other part placed on channel 81. When the two panels are brought together the two parts are mixed and the epoxy rapidly cures.

As mentioned above, a particularly useful laminate results when Applicant's process is carried out using one or more outer layers of polyester-fiberglass resin and an inner layer of a rigid polyurethane foam. While numerous attempts have been made to form a laminate by reacting a urethane foam between uncured layers of polyester-fiberglass this has resulted, in the past, in a laminate which will delaminate. It is Applicant's belief that this delamination failure experienced by others resulted from a reaction between styrene monomer and the polyurethane reactants at the interface between the layers.

As a result, when Applicant's process is carried out with a polyester resin and a polyurethane inner layer, it is important that the styrene monomer commonly present in polyester resins be prevented from reacting with the urethane. This may be carried out by bringing the polyester resin to a gelled state but not permitting it to fully cure prior to the polyurethane foaming reaction. It has also been found desirable to use a polyester resin formulation with a styrene content at 30% or less. When the polyester resin has gelled, that styrene monomer which has not already volatilized has cross linked with the polyester and thus is believed to be prevented from reacting with the polyurethane.

The gelling phenomenon of polyesters is discussed in the 1969–70 Modern Plastics Encyclopedia at pages 172 and 176. This article is incorporated by reference herein. As known to those skilled in the art, the time required for a particular polyester formulation to gel is dependent upon many factors including the nature and amount of the catalyst and inhibitor used.

The gellation time may readily be determined for any polyester formulation at a desired temperature by holding a sample of the polyester at the desired temperature and slowly stirring the polyester and noting the time at which it gels or begins to form a definite structure. For instance, if the polyester is being slowly stirred by a tongue depressor, after gellation, the tongue depressor can be withdrawn from the polyester and will not stick to the depressor but instead will retain some structural integrity. In other words, it will cease to be a syrup and become a jelly. Thus, when practicing the present invention on a particular polyester it is important to determine the gel time at various temperatures so that a molding temperature may be chosen which will permit the resin to gel and yet not cure while giving time to add the polyurethane reactants.

Once the resin has gelled it is further desirable to prevent a complete cure from taking place. In this way, the resin is still permanently deformable and the pressure generated by the urethane foam can be used to remove air bubbles and further to force the resin against the mold surface. The existence of a strong contact between the two reacting resin systems is believed to improve the chemical and physical bond between the urethane and the polyester after curing. The resin may be held in a gelled condition by lowering its temperature after it has reached a gelled state. Thus, when these particular resins are utilized, it is desirable to have a careful and accurate temperature control system to bring about gellation without curing and to maintain gellation for a period of time which will permit the addition of the prefoam.

The excellent bond exhibited between the polyester-fiberglass skins and the rigid polyurethane foam is believed to be both a chemical bond and a physical bond. While rigid urethane foam will not form a strong bond with an uncured polyester, it has been known that a very strong bond can result when a rigid urethane is reacted with a fully cured polyester sheet. It is believed that this same type of bond exists in the practice of Applicant's process as described above. There is, however, an additional physical bond which results from intermeshing of exposed fiberglass with the urethane foam. This results in a considerable degree of physical entanglement which, although not believed essential, does substantially increase the strength of the bond.

The rigid urethane foam is preferably a low density foam in order to minimize the weight of the finished panel. Densities as low as 2 pounds per cubic foot can be obtained by the use of a halocarbon blowing agent. Silicone surfactants are useful to keep the expanding bubbles small and uniform and are added to the polyol. The polyol is reacted with an isocyanate resulting in an exothermic reaction which causes the halocarbon to vaporize in a manner well know to those skilled in the art.

It has also been discovered that the urethane prefoam (that is, the mixed polyol and isocyanate prior to substantial reaction) may be more easily spread and reaction delayed by the addition of a low boiling halocarbon such as dichlorodifluoromethane to the polyol. This halocarbon will vaporize at room temperature and will serve to both cool and prefoam and reduce its viscosity and density thereby facilitating the spreading of the prefoam.

While Applicant's invention has been discussed in some detail with respect to the particular set of resins, the process is applicable to other fluid resins and liquid prefoams as long as the cured characteristics of the reactants will form a panel with the desired end properties.

The obvious requirements of weather resistance, fire resistance, and the like are, of course, necessary if the end use of the panel so requires. In order to practice the present invention, it is also necessary that the resin used for the outer skin be in a fluid form in its uncured state so that it may be sprayed or painted, rolled or the like onto the mold surfaces. It should be capable of forming a gel-like layer. The resin should also be capable of remaining in a deformable, uncured state until after the mold has closed.

It is not necessary that there be actual chemical cross-linking to form the gel-like layer as it is only the physical integrity that is required. This "gel-like" layer may be brought about by thickening additives, swelling agents, or a change in temperature or pressure which results in a resin layer which will not be significantly moved by an expanding foam in a closed mold. Furthermore the unreacted resin need not necessarily be a liquid as long as it has fluid properties and can be applied by techniques such as spraying, brushing, rolling or the like.

The inner foam core must be capable of expanding after a period of delay. That is, it must be capable of being applied while the mold is open and be retarded from a fully foamed condition until after the mold has closed. It is not harmful, and in fact may be beneficial, that the prefoam be partially foamed before the mold is closed and this may be used to aid in spreading the prefoam. It is useful that the foaming reaction give off heat to aid in curing the resin in the outer skins. With these considerations in mind, the following working example will be used to illustrate a preferred embodiment of the present invention.

EXAMPLE I

Mold surfaces 12 and 42 were waxed by the application of a coating of a paste carnauba wax in order to help insure that the cured resin would not stick to the mold surface. Secondly, a coating of mold release agent was sprayed on surfaces 12 and 42. Such mold release agents are well known to those skilled in the art and the silicone-containing agent sold under the tradename Ram Mold Release 87-X80 was used.

The water temperature in both mold halves was set to 70°F. A set of four pins was inserted in threaded holes provided in mold surface 42 and an aluminum frame was placed over the four pins so that there was one pin in each interior corner of the frame. The window frame has a wide flange at its lower edge and a narrow flange at its upper edge. The second set of four pins was screwed into four threaded holes in mold surface 12 and a wooden frame was placed on mold surface 12 and positioned by these four pins. The four hinged edges of the mold were placed in their closed or upright position and a pin was inserted in two adjacent hinged edges so that it protruded toward the center of the mold.

A conduit assembly having two electrical boxes was placed on these two pins located in the mold edges.

Next, a layer of thixotropic, unsaturated polyester resin sold under the tradename Polylite AX-5117 containing an ultra violet light screening agent and a fire retardant was mixed in a conventional resin spraying nozzle with 1% methyl ethyl ketone peroxide and was sprayed on mold surfaces corresponding to surfaces 42 and 12 of the drawing and on the interior surface of the four hinged edges of the mold. The resin was a fire retardant, thixotropic phthalic anhydride based resin containing styrene monomer and methyl methacrylate. The catalyst used was 1% methyl ethyl ketone peroxide. Although the resin was sprayed over the lower flange on the window frame, it was not sprayed in the interior of the frame or in the interior of the wooden mask on the other mold surface. No attempt was made to roll or compact the resin-glass chop as is the normal custom in laying up this type of skin.

Mold surfaces are next warmed to 75°F by the passage of warm water through the heat transfer tubes to gel the polyester resin. In the gelled state the resin is significantly cross-linked and has gained some structural strength but is still readily deformable. By the gelled state, it is intended to convey that the resin will not flow but still may be deformed and cured and remain in the deformed condition permanently after cure. The gel time using a 1% methyl ethyl ketone peroxide was 10 minutes. The mold temperature was then reduced to 70°F to prevent a substantial curing of the resin.

A low pressure urethane prefoam of the formulation described below was next extruded in a rope-like fashion onto the upper surface of the fiberglass-resin on mold surface 42. The urethane composition was formulated to give a free-rise density of 2 lbs. per ft.$^3$ as follows:

POLYOL

| | |
|---|---|
| Brominated polyol | 70.5 % |
| Dichlorodifluoromethane | 15 % |
| Silicone surfactant | 1 % |
| Amine catalyst | 1.5 % |
| Trichlorofluoromethane | 5 % |
| High chlorine, phosphorous containing fire retardant | 7 % |

ISOCYANATE

The isocyanate prepolymer used was diphenylmethane isocyanate having a 25 to 31 NCO. While the placement of the urethane prefoam is not particularly critical, it is useful that the prefoam be placed in various areas of the mold surface. This is particularly true when window frames, door frames, and the like are placed in the mold surface. By thus spreading out the prefoam, a substantial and important advantage is realized over those processes where a prefoam or foam is injected from the edges of the mold. For instance, by placing foam on all four sides of the window frame the possibility of void or hollow spaces around the frame is greatly reduced.

Note that two different fluoromethane liquids are utilized. While it is common to use trichlorofluoromethane, the addition of use dichlorodifluoromethane to the prefoam provides some important benefits. First, its expansion tends to cool the prefoam thereby delaying the time at which it will begin to react exothermically. Secondly, the trichlorofluoromethane tends to significantly increase the spreadability of the prefoam permitting it to be troweled or otherwise moved to different portions of the mold. The amount of urethane prefoam placed in the mold is sufficient to create a maximum internal pressure of 5 pounds per square inch.

The mold was next closed by its hydraulic torque motors and the temperature of the mold surfaces was increased to 200°F. Shortly thereafter, the urethane prefoam began to react thereby giving off heat and causing the trichlorofluoromethane to expand. This expansion forced the gelled resin firmly against the mold surfaces and the heat of reaction of the prefoam helped to cure the resin. After 12 minutes, the water in the mold jackets was reduced to 70°F. After allowing 5 minutes for the cured laminate to cool, the mold was opened and the laminate was removed. The flashing from the interior of the window frame, the electrical boxes and around the outer edge was easily removed by the use of a sharp knife.

The time-temperature cycle for the above-described laminate is shown in FIG. 5 of the drawings. The particular temperatures shown are for the resin-catalyst system described above and would be varied depending on the conditions required to cure the particular resin formulations used for the outer skin and inner foam.

Because of the thixotropic nature of the resin, it was not necessary that the mold surfaces be substantially horizontal. Irregular and even vertical surfaces may be used when a resin with a sufficient amount of thixotropy is chosen.

The panels produced by the process of the present invention have many uses. The panel has great structural strength, can be made fire resistant, has good weather resistance, and can be surfaced to duplicate almost any building material. It also is very light in weight, is inexpensive to produce, and may be used in many applications to replace conventional building materials. For instance, the panels may be used for fence panels to replace wood. The panel may be formed with a 12 inch by 12 inch cross-section and used as a foundation for a dwelling or other structure and thus replace concrete. Such panels could be used to construct burial vaults, and caskets which will have far superior water resistance to conventionally used materials.

By the provision of structural units which contain all the necessary conduits, plumbing and the like, it is possible to construct a dwelling in a very short period of time. In this way, the normal losses due to vandalism and petty theft are greatly reduced. The light weight of the structural units described herein permits economical shipping of the panels and also permit assembly by a small number of workers. Also, modular units can be assembled at the plant and shipped to the site for final joining to form a finished structure.

What is claimed is:

1. A process for fabricating a structural laminate comprising:
   bringing the surface of a first mold and the surface of a second mold to a predetermined temperature;
   covering both surfaces with a gellable, heat curable liquid resin layer;
   increasing the temperature of both surfaces to bring the resin layers thereon to a gelled state;
   controlling the temperature of both surfaces to prevent a substantially complete curing of the gelled resin layers;

adding a foamable liquid resin directly onto at least a portion of the exposed surface of at least one of the gelled resin layers;

creating a closed chamber by moving the covered surfaces into an opposing position whereby the surfaces are spaced apart a predetermined distance and the edges thereof are in an abutting relationship;

creating a pressurized environment within the closed chamber by allowing the foamable liquid resin to expand in said chamber while in direct contact with the resin layers with the pressure effecting an improved bond at the interface between the expanded foamable liquid resin and the gelled resin layers and forcing the exterior surface of the laminate into a defined configuration; and, curing the gelled resin layers and the expanded foamable resin.

2. The process of claim 1 wherein said gellable, heat-curable liquid resin layers are layers of polyester resin containing a strength-reinforcing material therein.

3. The process of claim 2 wherein said reinforcing material comprises glass fibers.

4. The process of claim 1 wherein said placing a gellable, heat-curable liquid resin step is carried out by spraying said gellable, heat-curable liquid resin.

5. The process of claim 1 wherein said foamable liquid resin forms a rigid urethane foam.

6. The process of claim 5 wherein said foamable liquid resin is partially but completely expanded at the time it is placed on said layer.

7. The process of claim 1 wherein at least a portion of said mold surface has a textured surface.

8. A process for fabricating a structural laminate comprising:

covering a surface of a mold with a layer of gellable heat curable liquid resin;

controlling the temperature of the mold surface to effect a predetermined transfer of heat between the mold surface and the liquid resin to bring the resin layer to a gelled state;

reducing the temperature of the mold surface to retard the curing of the resin layer;

adding a foamable liquid resin directly onto at least a portion of the exposed surface of the gelled resin layer and allowing the foamable liqud resin to expand; and curing the gelled resin layer and the expanded foamable resin.

9. A process for fabricating a structural laminate comprising:

bringing the surface of a mold to a predetermined temperature;

covering the mold surface with a layer of heat gellable curable liquid resin;

increasing the temperature of the mold surface to bring the liquid resin to a gelled state;

reducing the temperature of the mold surface to retard the curing of the resin layer;

adding a foamable liquid resin directly onto at least a portion of the exposed surface of the gelled resin layer and allowing the foamable liquid resin to expand; and curing the gelled resin layer and the expanded foamable resin.

10. The process of claim 9 wherein the temperature of the mold surface is increased during the step of curing the gelled resin layer and the expanded foamable resin.

11. The process of claim 10 wherein the temperature of the mold surface is reduced after the step of curing the gelled resin layer and the expanded foamable resin.

12. The process of claim 6 wherein said partial expansion is accomplished by the addition of a low boiling halocarbon to said foamable liquid resin prior to placing said foamable liquid resin on a surface of said layers.

13. The process of claim 12 wherein when said foamable liquid resin is polyurethane said low boiling halocarbon is dichlorodifluoromethane.

* * * * *